US012776219B2

(12) United States Patent
Welsh et al.

(10) Patent No.: US 12,776,219 B2
(45) Date of Patent: Oct. 27, 2026

(54) FLIGHT GUIDANCE CONTROLLER

(71) Applicant: Wisk Aero LLC, Mountain View, CA (US)

(72) Inventors: Lance Welsh, Truckee, CA (US); Andrew Fickling, Adelaide (AU); Marco Delgado, Portland, OR (US); Michael Blaine Johnson, Phoenix, AZ (US); Raymond J. Schreiner, Mountain View, CA (US); Scott Rossi, Campbell, CA (US); Uri Tzarnotzky, Sunnyvale, CA (US)

(73) Assignee: Wisk Aero LLC, Mountain View, CA (US)

( * ) Notice: Subject to any disclaimer, the term of this patent is extended or adjusted under 35 U.S.C. 154(b) by 55 days.

(21) Appl. No.: 18/420,158

(22) Filed: Jan. 23, 2024

(65) Prior Publication Data

US 2024/0249630 A1 Jul. 25, 2024

Related U.S. Application Data

(60) Provisional application No. 63/440,652, filed on Jan. 23, 2023.

(51) Int. Cl.
*G08G 5/54* (2025.01)
*G06F 3/04817* (2022.01)
(Continued)

(52) U.S. Cl.
CPC ........... *G08G 5/54* (2025.01); *G06F 3/04817* (2013.01); *G06F 3/04845* (2013.01); *G08G 5/21* (2025.01)

(58) Field of Classification Search
CPC .. G08G 5/54; G08G 5/34; G08G 5/57; G08G 5/80; G08G 5/21; G08G 5/26;
(Continued)

(56) References Cited

U.S. PATENT DOCUMENTS

D716,821 S 11/2014 Wood
9,007,327 B1 4/2015 Raghu et al.
(Continued)

FOREIGN PATENT DOCUMENTS

CA 2872698 A1 11/2013
CN 304711047 7/2018
(Continued)

OTHER PUBLICATIONS

U.S. Appl. No. 18/469,965 , Non-Final Office Action, Mailed On Jun. 6, 2025, 18 pages.
(Continued)

*Primary Examiner* — Ellis B. Ramirez
(74) *Attorney, Agent, or Firm* — Kilpatrick Townsend & Stockton LLP

(57) ABSTRACT

Embodiments provide techniques for illustrating and manipulating flight parameters communicated to an aircraft. More specifically, techniques disclosed herein provide a graphical user interface (GUI) that enables the adjustment of flight parameters via a translucent or transparent compass rose icon overlaid on a flight map, to intuitively select, transmit, and execute commands at an aircraft. For example, a controller may adjust one or more flight parameters, such as speed, heading, and/or altitude of an aircraft, such as an autonomous aircraft, by dragging an arrow icon around a compass rose icon displayed in connection with the aircraft on the GUI.

22 Claims, 11 Drawing Sheets

(51) Int. Cl.
*G06F 3/04845* (2022.01)
*G08G 5/21* (2025.01)

(58) Field of Classification Search
CPC ............. G06F 3/04817; G06F 3/04845; G06F 3/04847; B64U 2201/20
USPC ................. 701/16, 3, 14, 120; 340/3.1, 945; 715/772, 808, 810
See application file for complete search history.

(56) References Cited

U.S. PATENT DOCUMENTS

| | | | |
|---|---|---|---|
| D729,829 S | 5/2015 | Amin et al. | |
| D740,842 S | 10/2015 | Liu et al. | |
| D749,125 S | 2/2016 | Meegan et al. | |
| D757,053 S | 5/2016 | Nadiadi et al. | |
| D776,127 S | 1/2017 | Kim et al. | |
| D781,326 S | 3/2017 | Bray et al. | |
| D790,560 S | 6/2017 | Inose et al. | |
| D805,531 S | 12/2017 | Hersh et al. | |
| D808,421 S | 1/2018 | Yamasaki et al. | |
| D810,760 S | 2/2018 | Doyle et al. | |
| D813,250 S | 3/2018 | Hiljanen et al. | |
| 10,031,518 B1 | 7/2018 | Tofte et al. | |
| D842,318 S | 3/2019 | Jäger et al. | |
| D845,973 S | 4/2019 | Jaycobs | |
| D847,178 S | 4/2019 | Kato et al. | |
| D862,506 S | 10/2019 | Penha et al. | |
| D965,617 S | 10/2022 | Song et al. | |
| D977,515 S | 2/2023 | Kim et al. | |
| D979,578 S | 2/2023 | Saget et al. | |
| D980,247 S | 3/2023 | Gogna et al. | |
| D985,015 S | 5/2023 | Kanamaru et al. | |
| D985,589 S | 5/2023 | Lee et al. | |
| D985,615 S | 5/2023 | Lee et al. | |
| D1,004,603 S | 11/2023 | Song et al. | |
| D1,005,304 S | 11/2023 | Sajbel et al. | |
| D1,009,056 S | 12/2023 | Elder et al. | |
| D1,013,717 S | 2/2024 | Ishii et al. | |
| D1,019,702 S | 3/2024 | Schaefer et al. | |
| D1,023,041 S | 4/2024 | Dhaliwal et al. | |
| 2007/0244608 A1 | 10/2007 | Rath et al. | |
| 2009/0125163 A1 | 5/2009 | Duggan et al. | |
| 2013/0211635 A1* | 8/2013 | Bourret | G01C 23/00 |
| 2015/0051783 A1 | 2/2015 | Tamir et al. | |
| 2015/0081197 A1 | 3/2015 | Gaertner et al. | |
| 2015/0339931 A1* | 11/2015 | Yu | G08G 5/20 |
| 2016/0027310 A1* | 1/2016 | Samuthirapandian | G08G 5/26 |
| 2016/0063869 A1 | 3/2016 | Kathirvel et al. | |
| 2016/0107766 A1* | 4/2016 | He | B64D 45/08 |
| 2016/0307447 A1* | 10/2016 | Johnson | G08G 5/34 |
| 2017/0339337 A1* | 11/2017 | Kim | H04N 23/62 |
| 2018/0164801 A1* | 6/2018 | Kim | G08G 5/26 |
| 2018/0301041 A1 | 10/2018 | Chen | |
| 2019/0016475 A1 | 1/2019 | Zhong et al. | |
| 2019/0250601 A1 | 8/2019 | Donahoe et al. | |
| 2019/0371183 A1* | 12/2019 | Mecklem | G08G 5/723 |
| 2020/0073385 A1* | 3/2020 | Jobanputra | G06N 3/105 |
| 2020/0202732 A1 | 6/2020 | Mecklem et al. | |
| 2021/0366292 A1 | 11/2021 | Braaten | |
| 2022/0130263 A1 | 4/2022 | Neis et al. | |
| 2022/0230547 A1 | 7/2022 | Miller | |
| 2022/0415188 A1 | 12/2022 | Zhang | |
| 2023/0162610 A1* | 5/2023 | Beaudouin-Lafon | B64D 43/00 |
| 2023/0221721 A1* | 7/2023 | Konno | B64U 10/14 |

FOREIGN PATENT DOCUMENTS

| | | | |
|---|---|---|---|
| CN | 307390533 | 6/2022 | |
| CN | 307556461 | 9/2022 | |
| CN | 307600571 | 10/2022 | |
| EP | 3453617 A1 * | 3/2019 | B64D 1/08 |
| JP | 2019131734 A | 8/2019 | |
| WO | 2016103424 A1 | 6/2016 | |
| WO | 2021133543 A1 | 7/2021 | |

OTHER PUBLICATIONS

Calhoun et al., "Display and Control Concepts for Multi-UAV Applications", Handbook of Unmanned Aerial Vehicles, Available online at: https://link.springer.com/rwe/10.1007/978-90-481-9707-1_88, Jan. 1, 2014, pp. 2443-2473.
GB6264467 , "Office Action", Mar. 6, 2023, 2 pages.
NZ431909 , "First Examination Report", Apr. 5, 2023, 3 pages.
PCT/US2023/033120 , "International Search Report and the Written Opinion", Dec. 18, 2023, 11 pages.
U.S. Appl. No. 18/500,865 , Non-Final Office Action, Mailed On Aug. 25, 2025, 9 pages.
PCT/US2023/078532 , "International Search Report and Written Opinion", Feb. 14, 2024, 10 pages.
PCT/US2024/012597 , "International Search Report and Written Opinion", Apr. 30, 2024, 11 pages.
"Realtime", Available Online at: https://shorturl.at/LswUW, Oct. 10, 2023, 1 page.
"Sesar Erica Research Project Demonstrates Detect and Avoid in Live Flight Demonstration", Avaiable online at: https://www.unmannedairspace.info/latest-news-and-information/sesar-erica-research-project-demonstrates-detect-and-avoid-in-live-flight-demonstration/, Nov. 2, 2022, 2 Pages.
U.S. Appl. No. 29/853,825 , "Ex Parte Quayle Action", Aug. 21, 2024, 8 pages.
Bellamy , "Synturian Ready for Ai, Manned-unmanned Teaming Applications", Available online at: https://www.aviationtoday.com/2018/10/11/synturian-ready-ai-manned-unmanned-teaming-applications/, Oct. 11, 2018, 2 pages.
Meyers , "En Route to Gps-based Air Traffic Control (Images)", Available online at: https://www.cnet.com/pictures/en-route-to-gps-based-air-traffic-control-images/, Dec. 31, 2009, 1 page.
Application No. JP2023-005214 , Office Action, Mailed On Dec. 9, 2025, 5 pages.
Application No. EP23887014.1, Extended European Search Report, Mailed On Apr. 29, 2026, 10 pages.
Applicant No. EP23868857.6, Extended European Search Report, Mailed On Aug. 4, 2026, 14 pages.

* cited by examiner

FLIGHT GUIDANCE CONTROLLER

CROSS-REFERENCES TO RELATED APPLICATIONS

This application claims benefit under 35 USC § 119(e) to U.S. Provisional Patent Application No. 63/440,652 filed Jan. 23, 2023 and entitled “Flight Guidance Controller,” the disclosure of which is incorporated by reference herein in its entirety for all purposes.

BACKGROUND

Existing systems for communicating with devices often require traditional data entry methods to communicate with the device. For example, a user may use multiple data entry fields on a display device to input commands to be communicated to the device. However, the likelihood of data entry errors is high when there is an abstract level of symbolism used during data entry (e.g., numbers and symbols) and, while missing a keystroke during data entry is easy, noticing the error may not be, thus error correction may not occur fast enough to prevent accidents.

Embodiments of the invention, described herein, address these and other problems individually and collectively.

SUMMARY

Embodiments provide techniques for illustrating and manipulating aircraft flight parameters communicated to multiple aircraft. According to various embodiments, a graphical user interface (GUI) is provided to display and enable easy adjustment of aircraft flight parameters. The GUI may be animated and include graphical representations of aircraft, a compass rose, flight parameters, and related information displayed over (e.g., laid over) a moveable scalable map (e.g., capable of being panned and zoomed) representing the area over which an aircraft is flying. According to various embodiments, the aircraft controlled via GUI may include an autonomous aircraft, such as an autonomous vertical takeoff landing (VTOL) aircraft. In some embodiments, the aircraft may include an electric vertical takeoff landing (eVTOL) aircraft.

According to various embodiments, a method is provided which comprises displaying, using a computing device, a GUI on a display device, and representing an aircraft with a first icon of a plurality of icons on the GUI. The method further includes receiving, at the computing device, an input manipulating a second icon representing a flight parameter associated with the aircraft, wherein the input manipulating the second icon moves the second icon from a first position to a second position on the GUI. The method further includes transmitting, to the aircraft represented by the first icon, a command based at least in part on manipulation of the second icon representing the flight parameter.

In various embodiments, the method further comprises displaying one or more flight parameters associated with the aircraft, the one or more flight parameters including at least one of a heading, a speed, or an altitude associated with the aircraft, and, in response to detecting selection of the first icon, displaying, over the first icon, the second icon and a third icon of the plurality of icons, wherein the third icon represents a compass rose.

In various embodiments, at least the first, second, and third icons of the plurality of icons are overlaid on a map displayed on the GUI.

In various embodiments, at least the first, second, and third icons of the plurality of icons are transparent.

In various embodiments, the method further comprises displaying a third icon in response to detecting, at the computing device, manipulation of the second icon representing the flight parameters, the third icon representing a change in the flight parameter of one or more parameters associated with the aircraft.

In various embodiments, the third icon converges with the second icon as the aircraft executes the command based at least in part on the manipulation of the second icon.

In various embodiments, the third icon snaps to a location, the location representing a predetermined increment of the flight parameter.

In various embodiments, the method further comprises displaying a first visual cue indicating transmission of the command to the aircraft and displaying a second visual cue indicating receipt of the command by the aircraft.

In various embodiments, the method further comprises receiving one or more prohibited flight parameters and displaying a visual cue indicating the second icon is prohibited from being manipulated to a location in the GUI, the location representing a prohibited flight parameter of the one or more prohibited flight parameters.

In various embodiments, the method further comprises, in response to receiving a location selected for landing the aircraft, transmitting the command to the aircraft, the command triggering at least one or more flight procedures associated with landing the aircraft.

In various embodiments, one or more non-transitory computer-readable storage medium storing instructions are provided that, upon execution of a computer system, cause the computer system to perform the methods described above.

In various embodiments a system is provided to perform the methods described above.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1:
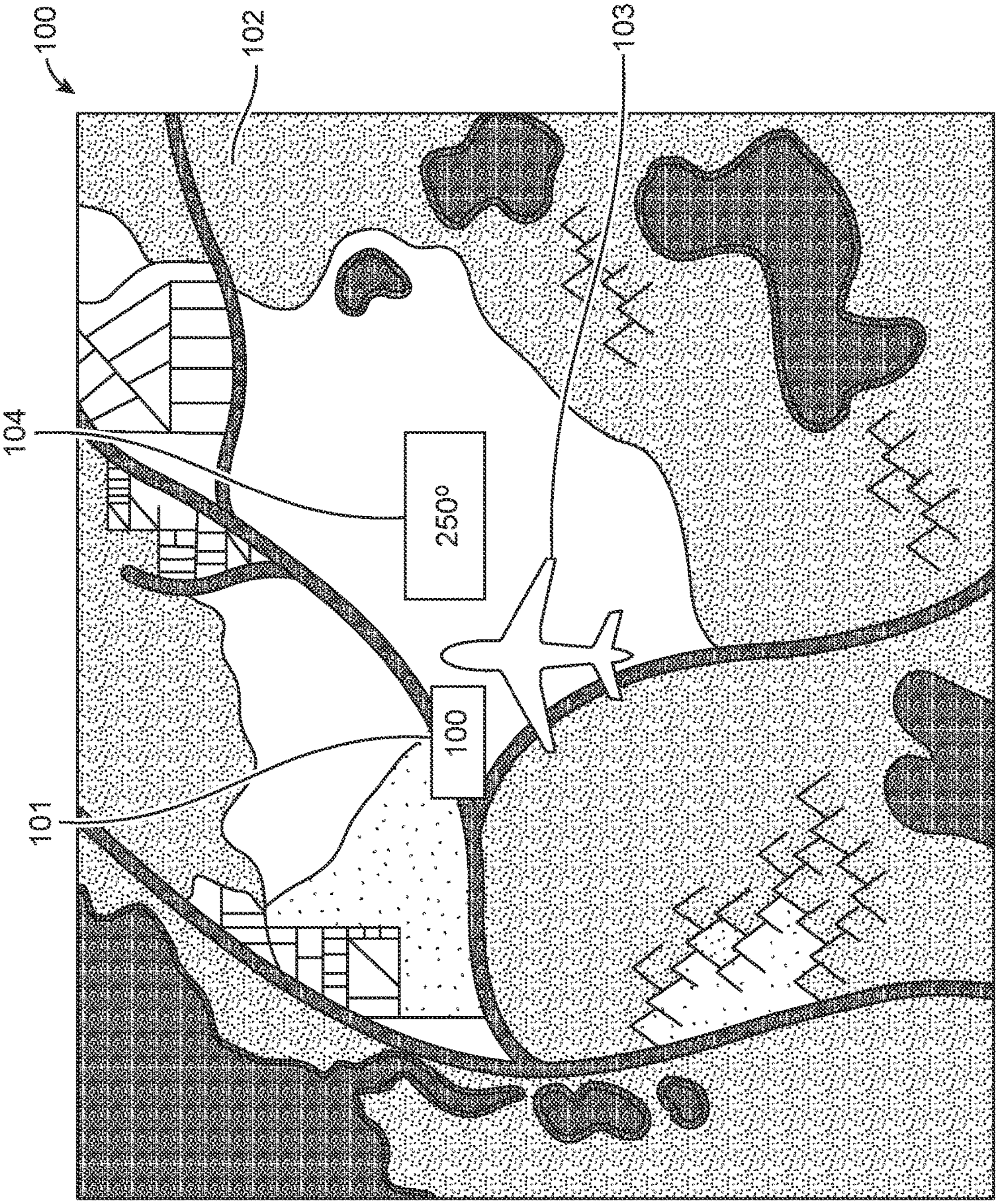
FIG. 1 illustrates an exemplary animated GUI depicting a flight map, according to various embodiments.

Techniques disclosed herein are related to an animated GUI for illustrating and manipulating aircraft flight information and/or commands communicated to multiple aircraft. According to various embodiment(s), the aircraft are autonomous aircraft that are configured to receive commands from a controller (e.g., supervising pilot, on-ground controller, onboard controller, etc.). The controller commands may be conveyed to the aircraft through the GUI. More specifically, techniques disclosed herein provide a GUI that enables the selection of an aircraft among one or more aircraft on a flight map, the adjustment of flight parameters of the selected aircraft via a translucent or transparent icon (e.g., a compass rose icon) overlaid on the flight map, to intuitively select, detect, transmit, and/or execute commands at the aircraft. For example, the controller may adjust one or more flight parameters, such as speed, heading, direction, and/or altitude, by dragging an arrow icon around a compass rose icon. Various inventive embodiments are described herein, including methods, processes, systems, devices, and the like.

The flight control system(s) described herein may simultaneously be used to complete other important flight tasks, such as monitoring the flight progress of an aircraft, information associated with the aircraft, and the location of nearby geographical hazards. However, using a display device to monitor and control multiple aircraft and a corresponding flight map can lead to a cluttered display where important information can easily be obscured by various data entry fields and icons. Such crowded displays can lead to increased likelihood that important information is missed and can lead to errors and accidents. Embodiments provide techniques, methods and systems for displaying command entry means without cluttering the display device such that important and/or relevant flight information displayed on the display device is not obscured by command entry means described herein.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary," or "example" is not necessarily to be construed as preferred or advantageous over other embodiments or designs.

Embodiments are directed to, among other things, techniques, methods and systems including an animated GUI for illustrating and communicating flight characteristics, flight parameters and/or commands to one or more aircraft. A controller (e.g., a user) may be in charge of monitoring, and controlling, one or more aircraft at a given time. Therefore, it is crucial for the controller to be aware of flight parameters associated with an aircraft, and/or relay commands and/or information to the correct aircraft in a timely and efficient manner. For example, the controller may command an aircraft to change a particular flight parameter using an animated GUI displaying interactive flight parameters.

FIG. 1 illustrates an exemplary animated GUI 100 depicting a flight map 102, according to various embodiments. One or more aircraft icons 103 may be depicted on a display device displayed via the exemplary animated GUI 100. The one or more aircraft icons 103 may be overlaid on the flight map 102 to represent one or more aircraft (further explained below in connection with FIG. 11). In an example, the aircraft icon 103 may represent a particular aircraft and may be positioned such that GUI 100 depicts the location and direction of the aircraft with respect to the flight map 102. For example, the aircraft icon 103 may be located over a particular section of the flight map 102 and pointing in a first direction (e.g., North) with respect to the flight map 102, which indicates that the aircraft represented by the aircraft icon 103 is directed North and at a physical location that corresponds to the particular section of the flight map 102. The animated GUI 100 may further display the aircraft icon 103 moving along the flight map 102 to reflect the changing location of the aircraft represented by the aircraft icon 103. For example, as the aircraft moves, the corresponding aircraft icon 103 moves along the flight map 102 depicted on the pane of the GUI 100. According to various embodiments, the animated GUI 100 may encircle the aircraft icon 103 equally on each side. By encircling the aircraft icon 103 by an animated GUI 100 in this manner problems such as ambiguity, offsets, and/or opaqueness caused by components, such as a dialog box, may be avoided. For example, as depicted in the animated GUI 100 in a situational and/or spatial context, the animated GUI 100 can provide a clear, unambiguous context on which an aircraft may be guided by a controller.

In some embodiments, alphanumerical representations of one or more flight parameters (e.g., heading 104, speed 101, and/or altitude) corresponding to an aircraft may be depicted proximate to the aircraft icon 103 representing the aircraft. For example, an aircraft with a heading 104 of 250 degrees may be depicted as an aircraft icon 103 overlaid on the flight map 102 and adjacent to an alphanumerical representation displaying the heading 104 as 250 degrees. In some embodiments, the one or more flight parameters 101, 104 may be stuck to the aircraft icon 103 and may move along the flight map 102 with the aircraft icon 103. For example, the one or more flight parameters 101, 104 may remain proximal to aircraft icon 103 even as the aircraft icon 103 appears to move across the flight map 102. By illustrating an aircraft icon 103 near one or more flight parameters 101, 104, where the one or more flight parameters 101, 104 correspond to the aircraft represented by the aircraft icon 103, pertinent information relevant to the aircraft may be easily viewed and considered by a controller when using the GUI 100. In turn, the GUI 100 can provide a minimally distracting display allowing a controller to quickly glean information from the GUI 100 and promptly relay commands and/or information to a desired aircraft in a timely and efficient manner.

According to various embodiments, the aircraft may be an autonomous aircraft. For example, the aircraft may include an autonomous electric vertical takeoff and landing (eVTOL) aircraft that is monitored and/or controlled via the animated GUI 100.

Figure 2:
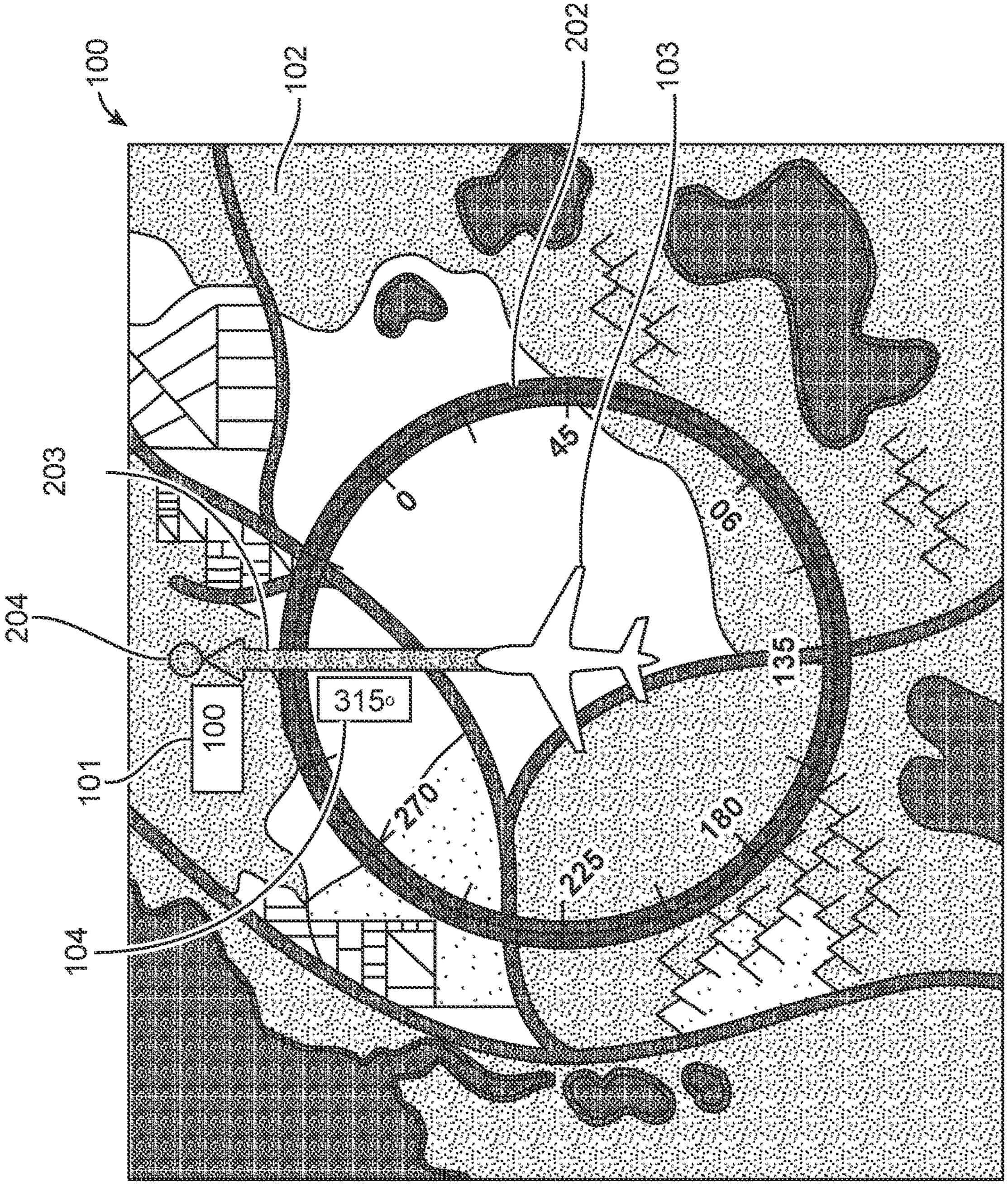
FIG. 2 illustrates an exemplary flight map depicted on a pane of a GUI overlaid with a Flight Guidance Controller (FGC), according to various embodiments.

FIG. 2 illustrates an exemplary flight map depicted on a pane of a GUI overlaid with a Flight Guidance Controller (FGC), according to various embodiments. A pane of the GUI 100 on the display device may be overlaid with an FGC. While the FGC is depicted in the Figures as a compass rose icon 202 and/or an icon representing current flight parameters (e.g., first arrow icon 203), the FGC may be any type of visual overlay which adequately draws focus to a particular one or more aircraft icons 103 depicted on the GUI 100. The FGC may be displayed when one or more locations on the GUI 100 are selected. For example, a controller may select the aircraft icon 103 causing the FGC to be displayed. Additionally and/or alternatively, the FGC may be displayed when a predetermined situation arises where it is pertinent that the controller's attention be drawn to the flight parameters 101, 104. For example, when the aircraft associated with the aircraft icon 103 comes within a predetermined distance of a prohibited airspace, the FGC may appear overlaid on a pane of the GUI 100.

Selection of an aircraft may occur by a controller's use of an input device such as a mouse or a pointer, by touch on a touchscreen, or from an asynchronous condition by the system when it is determined that an aircraft requires attention. Upon selection of the aircraft icon 103 depicted on the GUI 100, one or more icons (e.g., compass rose icon 202, first arrow icon 203, ball icon 204, and/or second arrow icon 301) used to convey flight parameters 101, 104 may appear overlaid on the flight map 102. In some embodiments, the one or more icons (e.g., compass rose icon 202, first arrow icon 203, ball icon 204, second arrow icon 301) may include the FGC as a compass rose icon 202, as illustrated in FIG. 2. The compass rose icon 202 may be overlaid on the flight map 102 and centered on or near the position of the aircraft icon 103 depicted on the GUI 100. The compass rose icon 202 may include visual indicators providing the current flight parameters 101, 104 of the aircraft. For example, the compass rose icon 202 may include a display of the cardinal directions and/or the heading 104, speed 101, and/or altitude of the aircraft associated with the depicted aircraft icon 103.

The compass rose icon 202 may be displayed such that it does not wholly obscure the flight map 102 or a particular area of interest on the GUI 100. For example, the compass rose icon 202 may appear transparent (e.g., a see-through shape as opposed to an opaque shape allowing objects behind the transparent shape to be distinctly seen) or translucent (e.g., a see-through shape which is not fully transparent allowing partial view of objects behind the shape) so as not to obscure the underlying information (e.g., flight map 102, or nearby objects). As a result, the compass rose icon 202 can be spatially oriented on the GUI 100 to correspond to a particular aircraft, as well as appear visually light weight such that the compass rose icon 202 does not clutter or obscure the flight map 102. In this manner, pertinent details concerning the aircraft represented by the aircraft icon 103 may be depicted proximate to the aircraft icon 103 without making it difficult to see the flight map 102. For example, if the compass rose icon 202 appears transparent, images behind the compass rose icon 202, such as details on a map depicted on the GUI 100, may be easily discerned by the viewer. If the compass rose icon 202 appears translucent, images behind the compass rose icon 202 may appear less detailed, but images overlayed on the compass rose icon 202, such as text, may be easier to discern by the viewer.

As previously discussed with respect to FIG. 1, the animated GUI 100 may be depicted based on situational and/or spatial context. For example, as an aircraft represented by the aircraft icon 103 flies over a particular location, the animated GUI 100 may display the aircraft icon 103 and a compass rose icon 202 over the corresponding location on a map. Additional details related to the situational and/or spatial context may further be displayed on the animated GUI 100 on or around the aircraft icon 103 and/or compass rose icon 202. For example, names of locations surrounding the aircraft, information related to the aircraft which corresponds to the aircraft icon 103, current weather patterns in the location of the aircraft, etc. may be depicted via the animated GUI 100 providing further situational and/or spatial context. In some embodiments, the compass rose icon 202 may illustrate information concerning the aircraft represented by the aircraft icon 103. For example, the compass rose icon 202 may illustrate static information such as the direction of magnetic north (e.g., the alignment of the compass rose icon 202 being adjusted with the magnetic declination in the region covered by the flight map 102), as well as dynamic information about the aircraft, such as flight parameters 101, 104 (e.g., speed 101, altitude, and/or heading 104). To facilitate the illustration and manipulation of the dynamic information, a first arrow icon 203 may be used in tandem with the compass rose icon 202. The placement of the first arrow icon 203 on the compass rose icon 202 may be used to provide a visual representation of the flight parameters 101, 104 for a controller. For example, as shown in FIG. 2, the first arrow icon 203 may be pointing to 315 degrees on the compass rose icon 202 to convey that the aircraft's heading is 315 degrees. Values related to the flight parameters 101, 104 may also be displayed proximate to the first arrow icon 203, the compass rose icon 202, and/or the aircraft icon 103. Additionally or alternatively, values related to the flight parameters 101, 104 may be displayed at a predetermined location on the GUI 100. For example, values related to the speed of the aircraft represented by the aircraft icon 103 may be depicted on a location of the GUI 100 that avoids obscuring the flight map 102 while clearly being associated with the aircraft icon 103.

According to various embodiments, the first arrow icon 203 may be depicted with one or more visual cues (e.g., change in arrow length, change in arrow color, change in arrow opacity, etc.) to illustrate one or more flight parameters 101, 104 (e.g., speed 101, altitude, and/or heading 104). For example, the length of the first arrow icon 203 may be used to illustrate a first flight parameter, such as speed, as further discussed below in connection with FIG. 9, while the orientation of the first arrow icon 203 may be used to illustrate a second flight parameter, such as heading 104. In some embodiments, the color of the first arrow icon 203 may indicate whether a command is being transmitted to or executed by the aircraft. For example, the first arrow icon 203 may be illustrated using a first color when a command is transmitted to the aircraft via the GUI 100, and the first arrow icon 203 may be illustrated using a second color when the aircraft has completed executing the command. Upon execution of the command, the position of the aircraft icon 103 and the associated flight parameters 101, 104 are also updated on the GUI 100.

In some embodiments, the first arrow icon 203 may include a ball icon 204 with which a controller may use to interact with the flight parameters 101, 104. In some embodiments, the ball icon 204 may be displayed outside of the compass rose icon 202. For example, the ball icon 204 may appear at the tip of the first arrow icon 203, which, when selected, may enable a controller to alter the flight parameters 101, 104 by dragging the ball icon 204 along a pane of the GUI 100. The ball icon 204 may be shown with one or more visual cues, such as a change in color, indicating that the ball icon 204 has been selected or deselected. For example, a ball icon 204 may be illustrated in a first color as attached to a first arrow icon 203 on the GUI 100. Upon selection of the ball icon 204, the ball icon 204 may be illustrated in a second color. Furthermore, when the ball icon 204 is deselected, the icon 204 may return to the first color.

Figure 3:
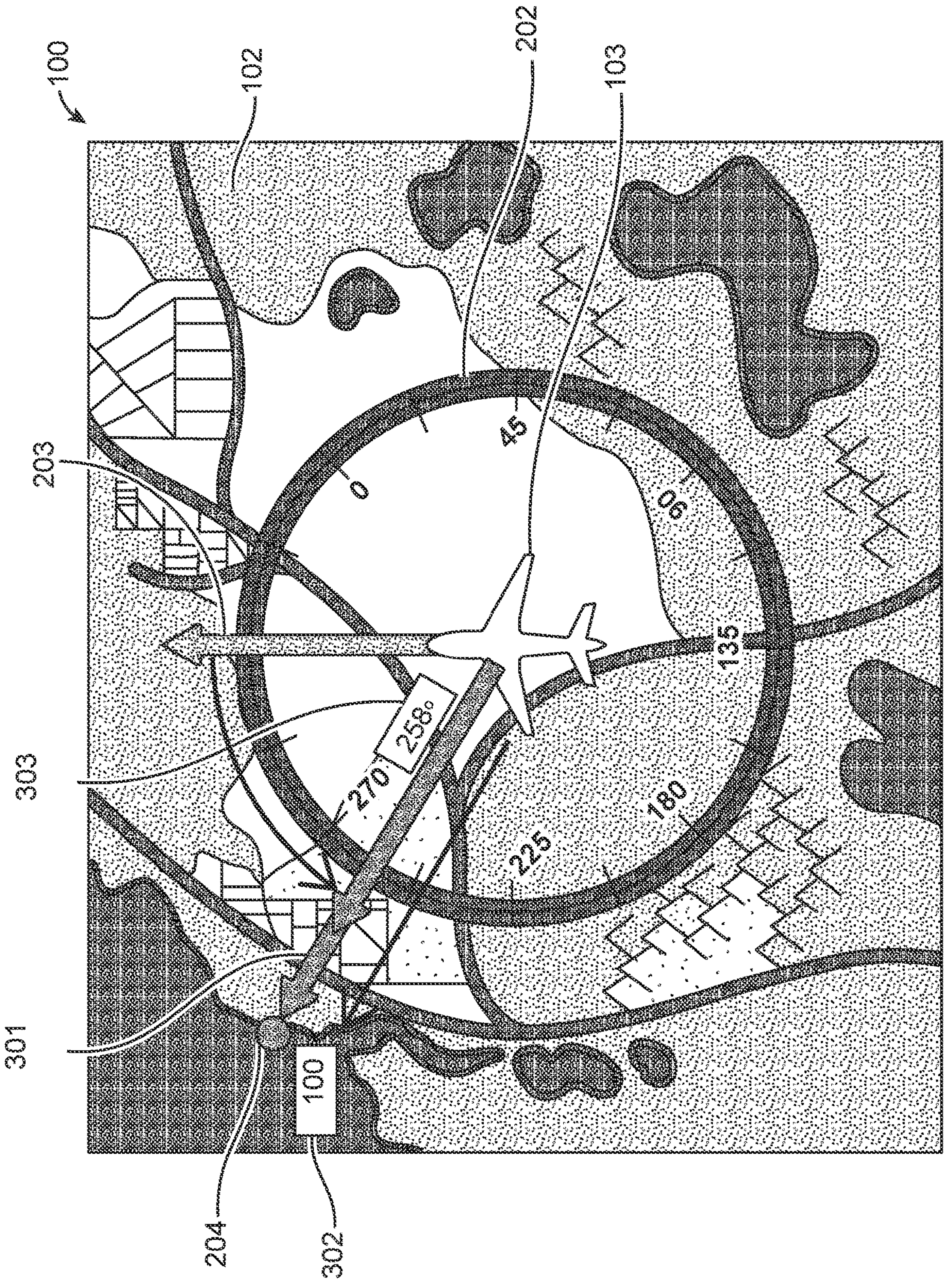
FIG. 3 illustrates the manipulation of a ball icon on the tip of an arrow icon to adjust one or more flight parameters, according to various embodiments.

FIG. 3 illustrates the manipulation of a ball icon 204 on the tip of an arrow icon (e.g., first arrow icon 203, second arrow icon 301, etc.) to adjust one or more flight parameters 101, 104, according to various embodiments. In an example, when a ball icon 204 attached to the first arrow icon 203 is selected, a second arrow icon 301 may appear. Initially, the second arrow icon 301 may be superimposed over the first arrow icon 203. A controller may drag the second arrow icon 301, using the selected ball icon 204, around the compass rose icon 202 to new locations on the GUI 100 representing selected flight parameters 302, 303. For example, the ball icon 204 on the first arrow icon 203 may be selected and a second arrow icon 301 may appear overlaid on the first arrow icon 203. Then the ball icon 204 and the second arrow icon 301 may be dragged around the compass rose icon 202, while the first arrow icon 203 remains at its original location illustrating the current state of the flight parameters 101, 104. Additionally and/or alternatively, the first arrow icon 203 may be transformed into the second arrow icon 301 using one or more visual cues, such as changing to a first color, when the ball icon 204 on the tip of the first arrow icon 203 is manipulated. The second arrow icon 301 may further be displayed on the flight map 102 using visual cues, such as using a first color, which may distinguish the second arrow icon 301 from the first arrow icon 203. This may allow a controller to differentiate the second arrow icon 301, depicting the selected (e.g., future, desired, instructed) flight parameters 302, 303, from the first arrow icon 203, depicting the current flight parameters 101, 104. The manipulation of the ball 204 and second arrow icons 301 may constitute a non-alpha numerical input. For example, instead of a controller inputting the alpha numerical value of 110 on the GUI 100 to change the speed parameter 302 to 110 knots, the controller may manipulate the ball 204 and/or second arrow icons 301 to a location on the GUI 100 representative of an increase of the speed parameter 302 to 110 knots.

Furthermore, instead of dragging the ball 204 and second arrow icons 301, the icons 204, 301 may be manipulated in alternative ways. In an example, the icons 204, 301 may be manipulated such that dragging the ball icon 204 parallel to the second arrow icon 301 changes the length of the second arrow icon 301. Increasing and decreasing the vector of the second arrow icon 301 may correlate to a change in a flight parameter 302, 303, such as the speed parameter 302. For example, a controller may drag the icons 204, 301 away from the center of the compass rose icon 202, such that the second arrow icon 301 lengthens. The longer second arrow icon 301 may represent the selection of an increase in the speed parameter 302 proportionate to the lengthening of the icon 301. In further embodiments, various methods of manipulating the ball 204 and second arrow icons 301 may be combined to change more than one flight parameter 302, 303 at once (e.g., GUI 100 may be used to generate simultaneous commands to modify two or more flight parameters).

In some embodiments, after dragging the ball 204 and second arrow icons 301 to a new location on the compass rose icon 202, releasing the ball icon 204 may place the icons 204, 301 at the new location. The new location on the compass rose icon 202 may depict one or more selected flight parameters 302, 303. For example, the ball 204 and second arrow icons 301 may be dragged from a heading 104 of 240 degrees, as shown on the compass rose icon 202, to a heading 303 of 120 degrees, as shown on the compass rose icon 202. Thus, by dragging the ball 204 and second arrow icons 301 around the compass rose icon 202, a controller may be able to select one or more flight parameters 302, 303 by releasing the icons 204, 301 at a new location.

In some embodiments, one or more flight parameters 302, 303 may be selected by releasing the ball icon 204 at a new location on the compass rose icon 202, where the new location is associated with the one or more selected flight parameters 302, 303. When the one or more selected flight parameters 302, 303 are chosen, a command to execute the one or more selected flight parameters 302, 303 may be detected, generated, and transmitted to an aircraft associated with the aircraft icon 103. For example, releasing the ball icon 204 at a location on the compass rose icon 202 representing a heading 303 of 240 degrees, may result in a command being detected, generated, and/or transmitted to the aircraft to change the aircraft's heading 303 to 240 degrees. Therefore, in some embodiments, the manipulation of the ball 204 and second arrow icons 301 to a new location on the compass rose icon 202 may enable a controller to choose one or more selected flight parameters 302, 303 for the aircraft to execute. Thus, the GUI 100 on the display device can provide an easy-to-understand visual representation of flight parameters 101, 104 that a controller can intuitively change by dragging an arrow icon (e.g., second arrow icon 301) around a compass rose icon 202.

Alphanumerical representations of one or more selected flight parameters 302, 303 may be illustrated on the GUI 100. In some embodiments, when the ball icon 204 is selected, one or more representations of the selected flight parameters 302, 303 may appear proximate to the ball 204 and second arrow icons 301. The selected flight parameters 302, 303 may correspond to the location of the ball 204 and second arrow icons 301 with respect to the compass rose icon 202. For example, when the ball icon 204 is selected and the second arrow icon 301 appears, one or more flight parameters 302,303 may also appear proximate to the two icons 204, 301. In some embodiments, as the icons 204, 301 are manipulated, the one or more alphanumerical representations may change corresponding to the changing flight parameters 302, 303. For example, when the ball icon 204 is dragged from a heading of 315 degrees to 258 degrees, as depicted on the compass rose icon 202, the displayed heading flight parameter 303 may also change from a value of 315 to a value of 258. The direct manipulation of the icons 204, 301 may show increasing or decreasing speed 302 or the directional change of the heading 303, which is conveyed by the movement and new position of the icons 204, 301, as well as the value corresponding to flight parameters 302, 303 displayed adjacent to the icons 204, 301.

By depicting the changing flight parameters 302, 303, the GUI 100 can provide a controller immediate, continuous, and precise feedback, while avoiding ambiguity. For example, when a controller enters a heading 303 using the icons 204, 301, the controller's movement of the icons 204,

301 may direct the turn of the aircraft. In turn, the GUI 100 can display an informative representation of the direction of the aircraft's turn (e.g., right, or left), while the numerical representation of the heading 303 proximate to the icons 204, 301 can furnish the controller with relevant detailed information.

Additionally, the illustration and manipulation of flight parameters 302, 303 via the GUI 100 can reduce the probability of data entry errors. The likelihood of data entry errors is high when there is an abstract level of symbolism (e.g., symbols and/or letters) in which the data is entered. For example, when a controller, via traditional data entry, attempts to command an aircraft to descend to an altitude of 10,000 ft but misses a keystroke and enters the value 1,000 ft, the ramifications could be significant and detrimental. While missing a keystroke during data entry is extremely easy, noticing the error may not be, thus error correction may not occur fast enough to prevent accidents. To avoid such errors, the GUI 100 presents a controller using the display device with concrete visual elements including, but not limited to, manipulatable icons (e.g., ball 204 and second arrow icons 301) and alphanumerical representations of current flight parameters 101, 104 and/or selected flight parameters 302, 303. Moreover, the GUI 100 is capable of supplying a controller with immediate and proportional feedback. For example, if a controller attempts to alter the heading 303 to 325 degrees, but inadvertently inputs 200 degrees, the visual representation on the GUI 100 can clearly depict the proportionally significant discrepancy between the selected and intended heading flight parameters 303 enabling the controller to promptly correct the error.

Flight parameters 101, 104 may also be adjusted via a sidebar present on the GUI 100. In further embodiments, one or more flight parameter 101, 104 (e.g., altitude) may be adjusted via controller input on at least a sidebar of the GUI 100. For example, a controller may command an aircraft to change altitude by selecting a sidebar on the GUI 100 and inputting a new altitude. Based on the controller input via the sidebar, a command to execute the selected one or more flight parameters 302, 303 may be detected, generated, and transmitted to the aircraft associated with the aircraft icon 103.

In some embodiments, when one or more flight parameters 101, 104 are manipulated, the flight parameters 101, 104 may also "stick" to the current values until the flight parameters 101, 104 are manipulated beyond a threshold. When the selected flight parameter 302, 303 values exceed the threshold, the values become freely adjustable. For example, a GUI 100 may depict information illustrating that the heading 104 of a particular aircraft is currently 315 degree, while the speed 101 is 100 knots. When a controller attempts to manipulate the ball 204 and second arrow icons 301 to a location on the compass rose icon 202 showing a heading 303 of 258 degrees, the icons 204, 301 may 'stick' to the current heading 104 of 315 degrees and the current speed 101 of 100 knots. Once the icons 204, 301 are manipulated beyond a particular threshold for the heading 104, but not the speed 101, the icons 204, 301 may become freely adjustable with respect to the heading flight parameter 104, but not the speed flight parameter 101. In this way, the controller may be able to select the desired heading 303 of 258 degrees while the speed flight parameter 101 remains unchanged. Thus, it can be easier to manipulate one flight parameter 302, 303, while keeping a different flight parameter 101, 104 value constant.

After a predetermined time period has elapsed, the ball icon 204 may be depicted with one or more visual cues to convey various events. For example, the ball icon 204 may turn magenta first color after 10 seconds to convey that flight landing procedure has been initiated for the aircraft associated with the aircraft icon 103. In some embodiments, the predetermined period of time may be associated with a controller interaction with the GUI 100 and/or the ball icon 204. Particularly the depiction of one or more visual cues may convey that the ball icon 204 and/or one or more locations on the GUI have not been interacted with for a predetermined period of time. For example, if a controller has not interacted with the ball icon 204 for 10 seconds, the ball icon 204 may change colors, change opacity, disappear, etc. In another embodiment, the depiction of the ball icon 204 with one or more visual cues after a predetermined period of time may be associated with one or more commands detected, generated, and/or transmitted to an aircraft associated with an aircraft icon 103. For example, a controller may select a ball icon 204 and drag the ball icon 204 to a location on the compass rose icon 202 indicating a heading 303 of 245 degrees. The ball icon 204 may then remain visible on the pane of the GUI 100 while a command, associated with changing the heading 303 to 245 degrees, is generated and transmitted to the aircraft. When the command is received by the aircraft, the ball icon 204 may then change colors, disappear, turn opaque/transparent/translucent, etc. Additionally or alternatively, once the command is executed by the aircraft (e.g., the aircraft executes the command completing the transition from its current heading 104 to a heading 303 of 245 degrees), the ball icon 204 may change colors, disappear, turn opaque/transparent/translucent, etc. In another embodiment, the predetermined period of time may be associated with a preset value or a controller input value. For example, once a controller has dragged the ball icon 204 to a location on the compass rose icon 202 indicating a heading 303 of 245, the ball icon 204 may disappear, turn opaque/transparent/translucent, etc. after a preset period of 10 seconds. If a controller wishes to change the period of time, the controller may customize the period of time, such as 20 seconds, after which, the ball icon 204 will disappear turn opaque/transparent/translucent, etc.

Additional steps/tasks/actions may be required to complete a confirmation process. In some embodiments, one or more additional selections may be required to confirm the detection, generation, transmission, and/or execution of a command by an aircraft. For example, if a heading 303 of 270 degrees is selected, before generating the command, an additional pop-up may appear at a location on the GUI 100 requesting the controller to confirm the input. If the controller selects to confirm the input, then the command corresponding to changing the heading 303 to 270 degrees may then be generated and transmitted to an aircraft for execution. This multi-step selection for sending and executing commands by an aircraft may ensure that commands are being sent intentionally. In some embodiments, if one or more additional selections are not made for a predetermined period of time, then a selected command may be cancelled. For example, if a heading 303 of 270 degrees is selected and, after a pop-up appears requesting confirmation of the command, the controller does not confirm the command for 20 seconds, the command may be cancelled. One of ordinary skill in the art will appreciate that the confirmation processes described herein are for exemplary purposes only and are not to be construed as limiting. Various additional steps/tasks/actions/operations, etc. may be enacted to complete a confirmation process.

Figure 4:
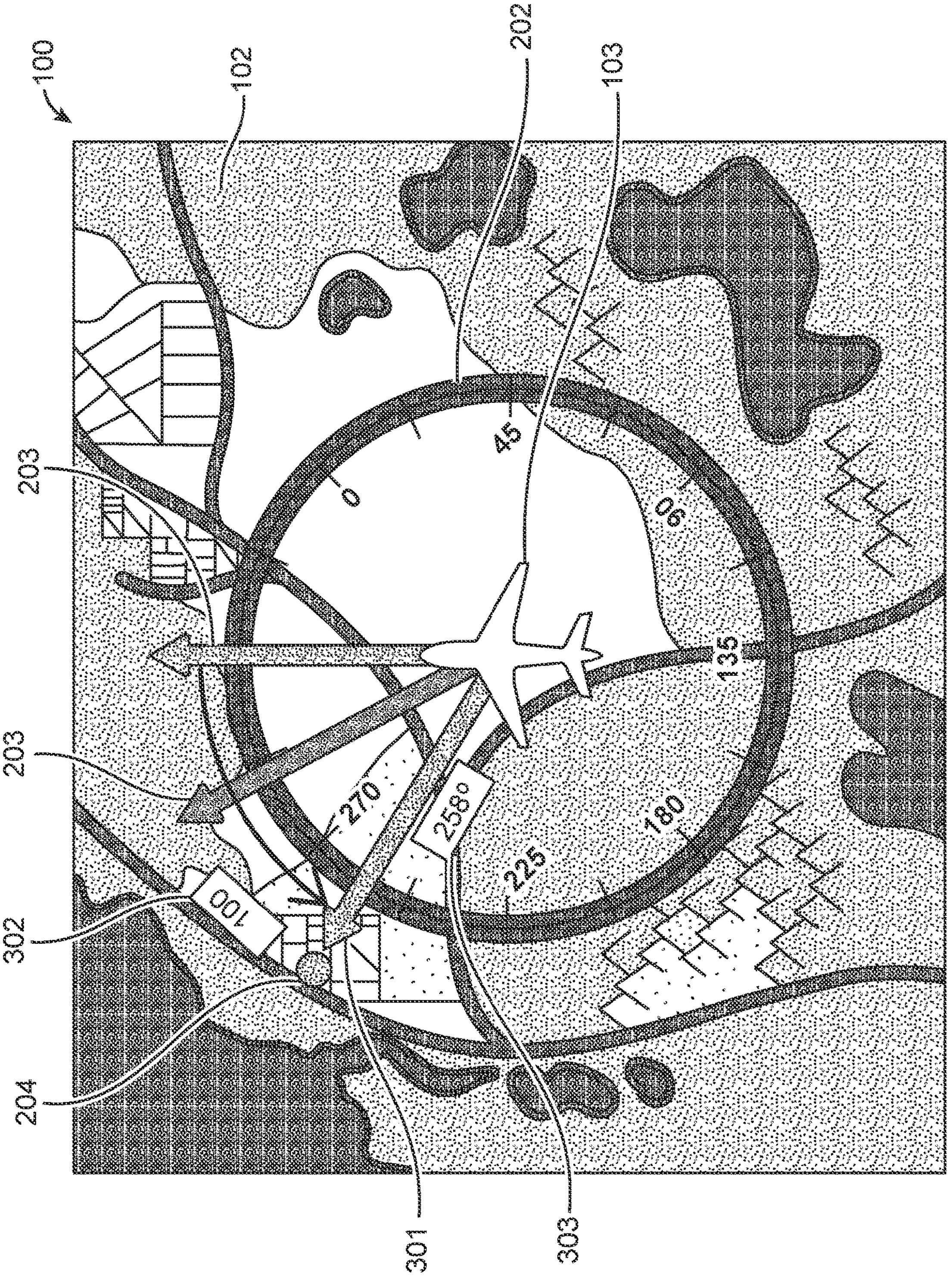
FIG. 4 illustrates the movement of arrow icons to convey updated flight parameters of an aircraft, according to various embodiments.

FIG. 4 illustrates the movement of arrow icons 203, 301 to convey updated flight parameters 302, 303 of an aircraft, according to various embodiments. In an example, once execution of a command begins, a first arrow icon 203 may gradually travel around the compass rose icon 202 towards the second arrow icon 301. The first arrow icon 203 may represent the one or more current flight parameters 101, 104 of the aircraft represented by the aircraft icon 103. Therefore, the gradual movement of the first arrow icon 203 around the compass rose icon 202 towards the second arrow icon 301 may illustrate the execution of the command by the aircraft as the aircraft turns. For example, when a command to turn the direction of an aircraft is sent to the aircraft to change the current aircraft's heading 104 of 240 degrees to a heading 303 of 120 degrees, the first arrow icon 203, starting at the 240 degree marker on the compass rose icon 202, may move towards the second arrow icon 301 at the 120 degree marker on the compass rose icon 202 as the aircraft executes the command and turns. The movement of the first arrow icon 203 may provide a controller with a visual representation of the execution of the command to change the heading flight parameter 104 (e.g., a visual representation of the aircraft turning to the updated heading flight parameter 303). Furthermore, the alphanumerical representations of the one or more current flight parameters 101, 104 may gradually increase or decrease as the first arrow icon 203 moves across the GUI 100. In this way, the turn direction of an aircraft can be intuitively and unambiguously implied via the manipulation of the first arrow icon 203 and/or the second arrow icon 301.

In various embodiments, the aircraft includes one or more sensors and/or flight computer. The one or more sensors and/or flight computer may communicate with a computer system (e.g., computing device) executing the GUI 100, such that the current flight parameters 101, 104 of the aircraft are continuously obtained from the aircraft in real time. Thus, as the aircraft executes a command, a controller can be provided with up-to-date information concerning the aircraft via the GUI 100.

In some embodiments, the first arrow icon 203 may converge with the second arrow icon 301, indicating that the aircraft has completed execution of the command. One or more visual cues may be displayed when the first and second arrow icons 203, 301 come together (e.g., converges). For example, when the first arrow icon 203 converges with the second arrow icon 301, the second arrow icon 301 may disappear and/or the ball icon 204 may change colors. Furthermore, in an embodiment when the second arrow icon 301 converges with the first arrow icon 203, the ball icon 204 may remain on the GUI 100, appearing at the tip of the first arrow icon 203. In another embodiment, the ball icon 204 may disappear when the second arrow icon 301 and the first arrow icon 203 converge. Once the first arrow icon 203 and the second arrow icon 301 converge, the first arrow icon 203 may disappear such that the GUI 100 only depicts the second arrow icon 301. The remaining second arrow icon 301 may indicate that the command sent to the aircraft has been executed and, in turn, the GUI 100 may illustrate the new flight parameters 302, 303. For example, a controller may select and drag a second arrow icon 301 to a location on the compass rose icon 202 representing a selected heading 303 of 258 degrees and a selected speed 302 of 100 knots. When the first arrow icon 203 converges with the second arrow icon 301, an aircraft has completed execution of a command to change the heading to 258 degrees and the speed to 100 knots. The GUI will then reflect the new flight parameters 302, 303 as a heading of 258 degrees and a speed of 100 knots.

Figure 5:
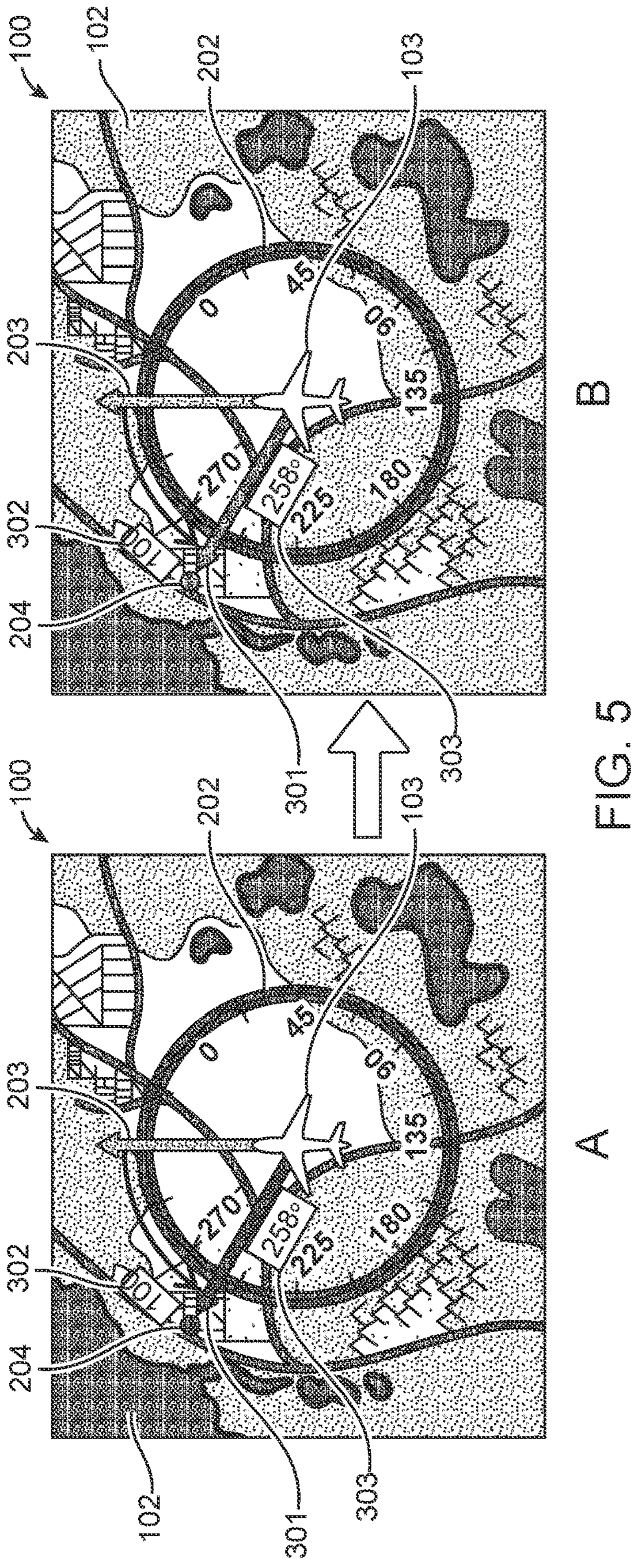
FIG. 5 illustrates visual cues depicting the transmission to and receipt of commands by an aircraft, according to various embodiments.

FIG. 5 illustrates visual cues depicting the transmission to and receipt of commands by an aircraft, according to various embodiments. Visual cues may be used to help a controller gather various types of information simply by observing the GUI 100. In FIG. 5 pane A illustrates a command being entered via the GUI and pane B illustrates the command being transmitted and/or received by the aircraft that corresponds to the aircraft icon 103 depicted on the GUI 100. In an example, after one or more selected flight parameters 302, 303 have been chosen by releasing a second arrow icon 301 at a new location on a compass rose icon 202, as shown in pane A of the GUI 100, a visual cue, such as flashing and/or a change in color, may be used to indicate that a command to change the one or more current flight parameters 101, 104 is being transmitted to the aircraft represented by the aircraft icon 103. In some embodiment, a first visual cue may indicate the transmission of the command and a second visual cue may indicate the receipt of the command. For example, the aircraft computer may communicate receipt of the commands to the controller computer (e.g., server computer executing the GUI 100). Upon receipt, another visual cue, such as flashing and/or a change in color, may be used to indicate that the command has successfully been received by the aircraft, such as illustrated in pane B of the GUI 100. In further embodiments, the visual cue may continue until the transmission is completed and the command has been received by the aircraft. For example, after a controller has selected a new heading flight parameter 303 of 120 degrees, a second arrow icon 301 may begin to flash, conveying that a command to change the current flight parameter 104 is being transmitted to a particular aircraft, as illustrated in pane A. When the command has successfully been transmitted to the aircraft, and/or a confirmation is received from the aircraft, the second arrow icon 301 may stop flashing and/or change color, conveying that the command has been successfully transmitted to the particular aircraft, as illustrated in pane B.

In some embodiments, one or more visual cues may be used to indicate that the transmission of a command to an aircraft has been unsuccessful. For example, if there is a disruption in the transmission of a command to an aircraft and the command is not received, the second arrow icon 301 may change color, showing the controller that the command has not been received by the aircraft. By using one or more visual cues to convey that a command is being transmitted and has been successfully or unsuccessfully received by an aircraft, a controller can be made aware of potential communication issue with a particular aircraft. With this information, the controller may then be empowered to remedy the situation. For example, the controller may resend a command that was not successfully received.

Figure 6:
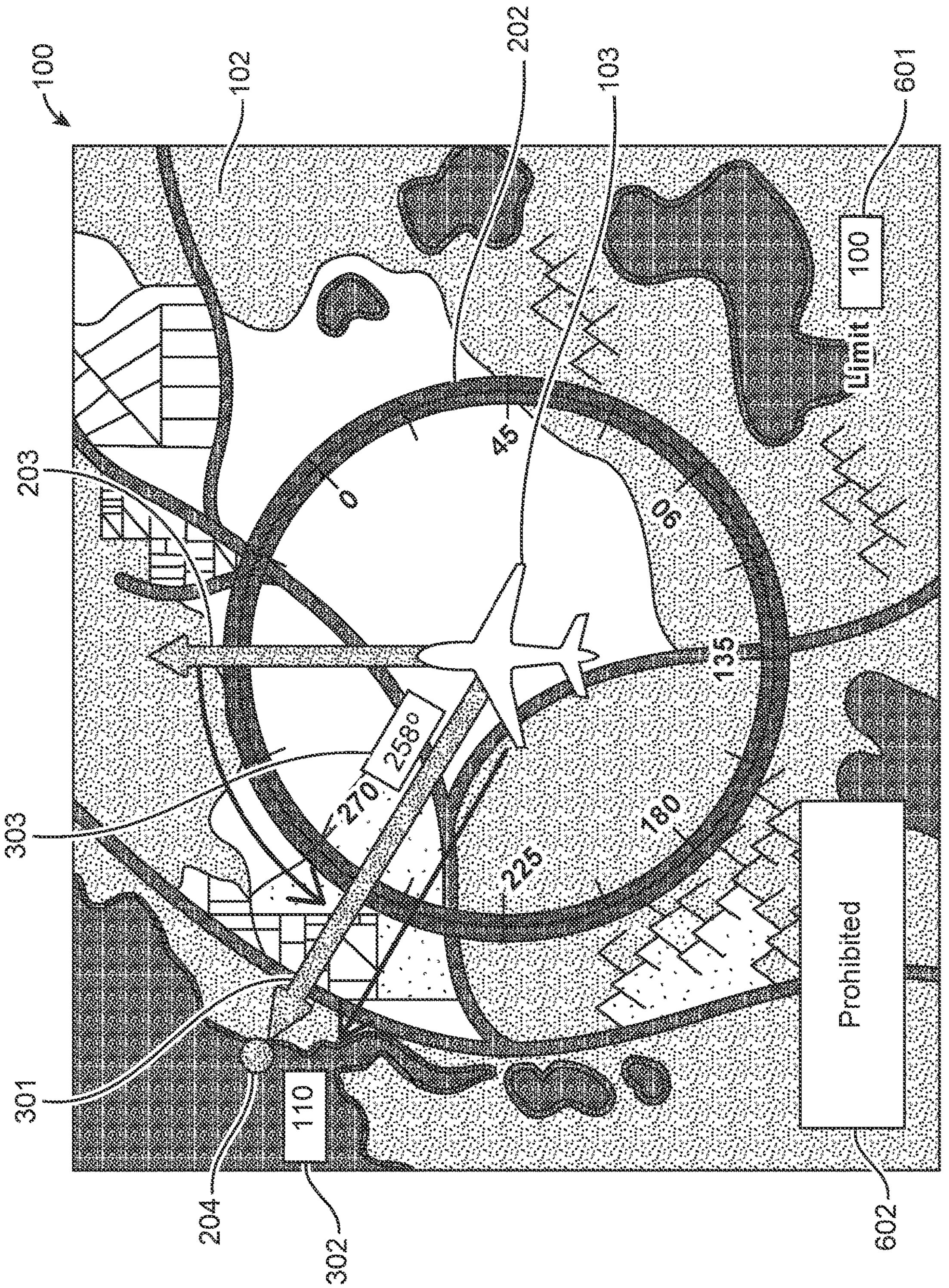
FIG. 6 illustrates the selection of one or more flight parameter limits, according to various embodiments.

FIG. 6 illustrates one or more flight parameter limits, according to various embodiments. In some embodiments, a controller may set one or more flight parameter limits to prevent the selection and execution of selected flight parameters 302, 303 exceeding the set limits 601. In some embodiments, the computer system may retrieve the flight parameter limit from a database or from the flight plan assigned to the aircraft. A pane of the animated GUI 100 may be dedicated to indicating upper and lower limits using a flight parameter limit indicator 601 for one or more selected flight parameters 302, 303. In some embodiments, a flight parameter limit may be dynamic based on flight conditions (e.g., flight plan, terrain, weather conditions) of the aircraft. The flight parameter limit indicator 601 may be automatically adjusted to indicate the current limit. The implementation of the flight parameter limits may prevent a controller from subsequently selecting flight parameters 302, 303 beyond the assigned upper and/or lower limits. In the exemplary embodiment illustrated in FIG. 6, the flight parameter limit indicator 601 may indicate an upper limit of 100 knots for the speed 302 of an aircraft for the given terrain and flight conditions. One of ordinary skill in the art will appreciate that the upper limit indicated herein is for exemplary purposes only and is not construed to be limiting. Any speed limit may be used in connection with the embodiments described herein. If the upper limit of 100 knots is selected for the speed 302 of an aircraft, the controller may be prevented from selecting a speed 302 of 110 knots based on the set limit. By allowing the selection of flight parameter limitations, the controller is provided with further intuitive and fine grain control of an aircraft via the animated GUI 100.

In various embodiments, one or more flight parameters 302, 303 may be constrained to a defined range based on the operating envelope of the aircraft. For example, if it is determined that the operational limit of the aircraft speed is 150 knots, then the speed 302 will be constrained to a maximum speed of 150 knots to stay within the flight envelope. This may limit the range of commands that may be generated and transmitted to the aircraft. For example, if the speed 302 is set to have a range between 100 knots and 150 knots, then if a controller attempts input a speed 302 of 160 knots, a command may not be generated and/or transmitted to the corresponding aircraft.

In some embodiments, when a selected flight parameter 302, 303 that exceeds a set limit is chosen, a visual indicator 602 may be displayed indicating that the selected flight parameter 302, 303 is beyond the set limit. For example, if an upper limit of 100 knots is selected for the speed 302 of an aircraft and a controller attempts to select a speed 302 of 160 knots, a visual indicator 602 may be displayed on the pane of the GUI 100 to inform the controller that the chosen speed 302 is outside the permitted range. Thus, instead of transmitting a command to the aircraft to change the speed 302 to a value outside the permitted range, the input and/or transmitting of the command is rejected preventing execution of the unpermitted speed change.

Additionally and/or alternatively, one or more selected flight parameters 302, 303 may be constrained by limiting the movement of the second arrow icon 301 and/or its correlating target value. For example, if the controller attempts to select a flight parameter 302, 303 that exceeds the set limit 601 by dragging the ball 204 and second arrow icons 301 to a new location on the compass rose icon 202, the ball 204 and second arrow icons 301 may snap back to the position of the first arrow icon 203, effectively preventing the controller from selecting the prohibited value (e.g., prohibited flight parameter). One or more visual cues, such as the second arrow icon 301 flashing and/or changing colors, may also indicate that the selected flight parameter 302, 303 is prohibited. For example, if headings between 225 degrees and 270 degrees constitute prohibited flight parameters, then when the controller drags the ball 204 and second arrow icons 301 through the area of the compass rose icon 202 which represents that heading range of 225 degrees to 270 degrees, the second arrow icon 301 may turn opaque/transparent/translucent, change colors, flash, etc. to indicate that a selection of a heading 303 within the particular range is prohibited. Alternatively or additionally, when the ball 204 and second arrow icons 301 are moved and released at a location on the compass rose icon 202 representing a prohibited action and/or prohibited flight parameters, the ball 204 and second arrow icons 301 may turn color, change opacity, etc. and gradually return to the position of the first arrow icon 203. In some embodiments, if the ball 204 and second arrow icons 301 are being dragged over an area of compass rose icon 202 representing a prohibited action (e.g., selection of one or more prohibited flight parameters 302, 303), one or more visual cues may be presented to show that the ball 204 and second arrow icons 301 are over a location which is disallowed. For example, in the case where a heading range between 225 degrees to 270 degrees is prohibited, when a controller drags the ball 204 and second arrow icons 301 through this range on the compass rose icon 202, the ball 204 and second arrow icons 301 may change colors, turn opacity, flash, appear as dashed lines, disappear, etc. This changing in the depiction of the ball 204 and second arrow icons 301 may then convey to the controller that an attempt to select a heading 303 between 225 degrees to 270 degrees will be rejected.

Figure 7:
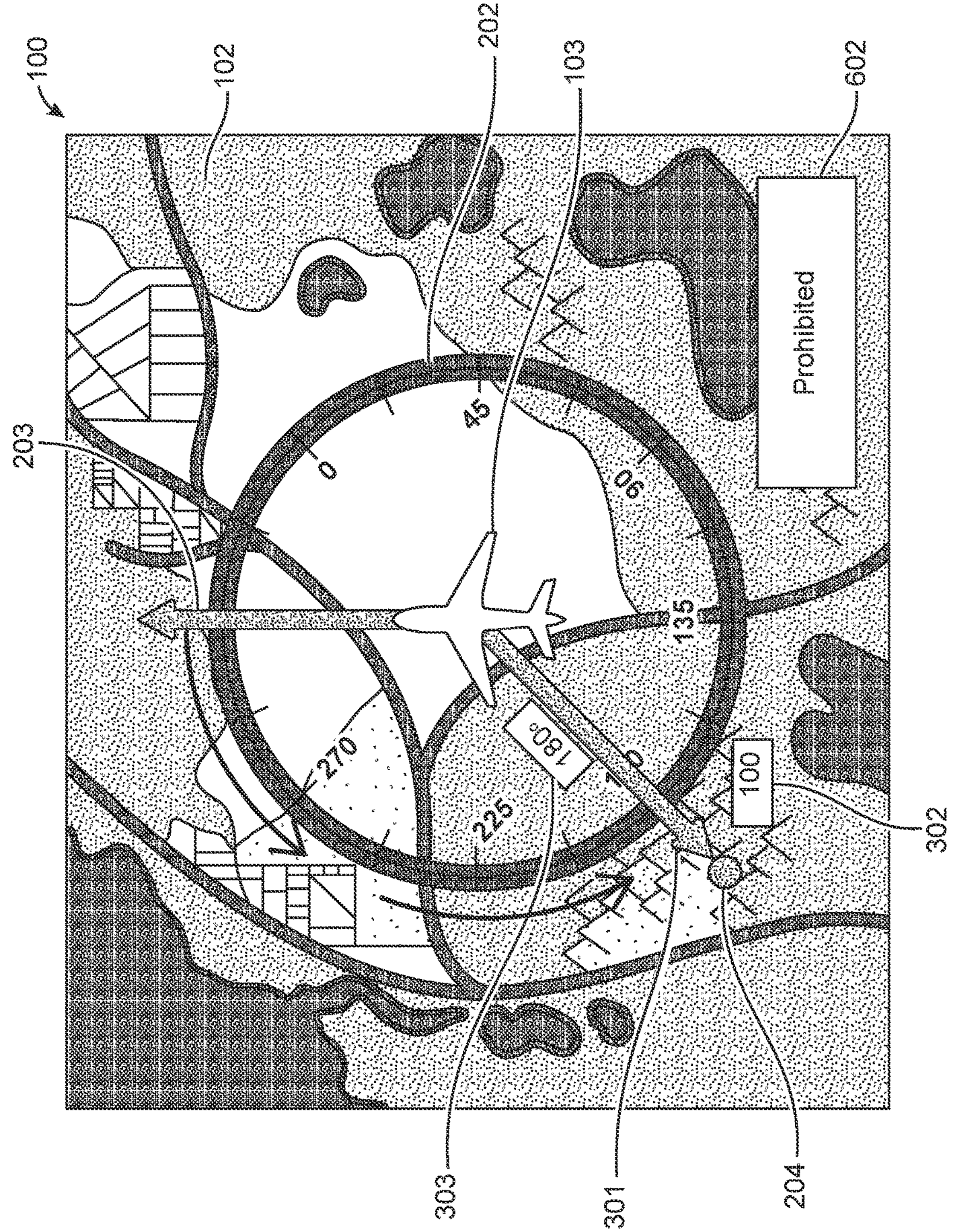
FIG. 7 illustrates implementing visual cues to indicate prohibited flight paths, according to various embodiments.

FIG. 7 illustrates implementing visual cues to indicate prohibited flight paths, according to various embodiments. In some embodiments, it may be determined that hazards and/or restricted locations may intersect a selected route of the aircraft. If a controller attempts to command a flight via the animated GUI 100 towards a hazard and/or restricted location, a visual cue may be used to relay that the chosen flight path is unadvisable or prohibited. For example, if a controller, by manipulating the ball 204 and second arrow icons 301, attempts to direct the aircraft in the direction of terrain that is determined to be hazardous, the ball 204 and second arrow icons 301 may flash to inform the controller that the attempted action is prohibited. In some embodiments, a controller may designate, via the GUI 100, hazardous or restricted locations. Additionally and/or alternatively, an external source may communicate to the server computer executing the GUI 100 hazardous or restricted locations. The restricted paths may be determined based on one or more factors, such as, but not limited to, current air traffic conditions, weather conditions, topography, restricted airspace, etc.

In some embodiments, if a hazardous or restricted location intersects a selected flight route, a visual indicator 602 may be displayed indicating that the flight route includes a hazardous or prohibited location. For example, if there is an attempt to direct the aircraft in the direction of a restricted location, a visual indicator 602 may be displayed on a pane of the GUI 100 to inform the controller that the chosen flight route includes the restricted location. When it is determined that a hazard and/or restricted location intersects a selected route of the aircraft, the execution of said route may be prevented. Thus, a controller is given a clear indication that the selected route may be ill-advised to travel, and a potential accident may easily be averted.

In some embodiments, a portion of the compass rose icon 202 may be depicted with one or more visual cues to indicate that a hazardous or restricted location will intersect a flight route corresponding to the selection of the portion of the compass rose icon 202. For example, a portion of the compass rose icon 202 representing a heading 303 between 0 degrees to 45 degrees may be depicted in a different color, opacity, etc. than the other portion(s) of the compass rose icon 202. The controller is thus provided a visual representation that a selection of a particular location on the compass rose icon 202 corresponds to a flight path intersecting with a hazardous or restricted location. Thus the controller may more easily avoid ill-advised or dangerous travel routes easily averting potential errors and/or accidents.

Figure 8:
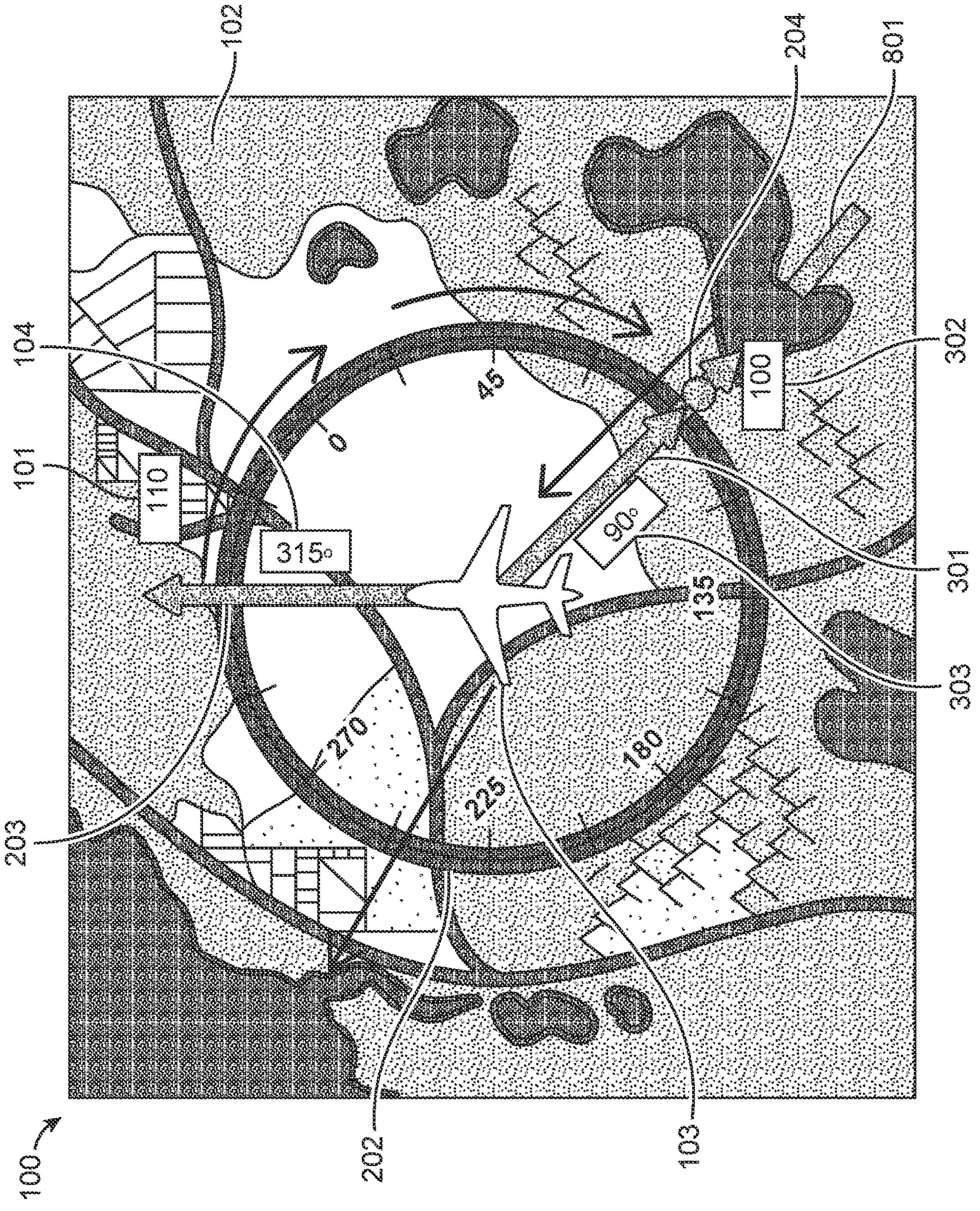
FIG. 8 illustrates the initiation of one or more flight procedures based on the selection of flight parameters, according to various embodiments.

FIG. 8 illustrates the initiation of one or more flight procedure based on the selection of flight parameters 302,

303, according to various embodiments. In some embodiments, the selection of one or more flight parameters 302, 303 may initiate one or more flight procedures. For example, a controller may select one or more flight parameters 302, 303 that indicate that the controller desires to land the aircraft, such as designating a route ending at a landing location 801 and/or reducing the speed of the aircraft. In response to the selection of the flight parameters 302, 303 indicative of landing the aircraft, one or more flight procedures associated with landing an aircraft may be initiated. For example, after the selection of a landing location 801, glide slope procedures may be initiated, and a particular altitude may be communicated to and executed by the aircraft. In some embodiments, the aircraft icon 103 may be shown with one or more visual cues to indicate that one or more flight procedures have been initiated.

Figure 9:
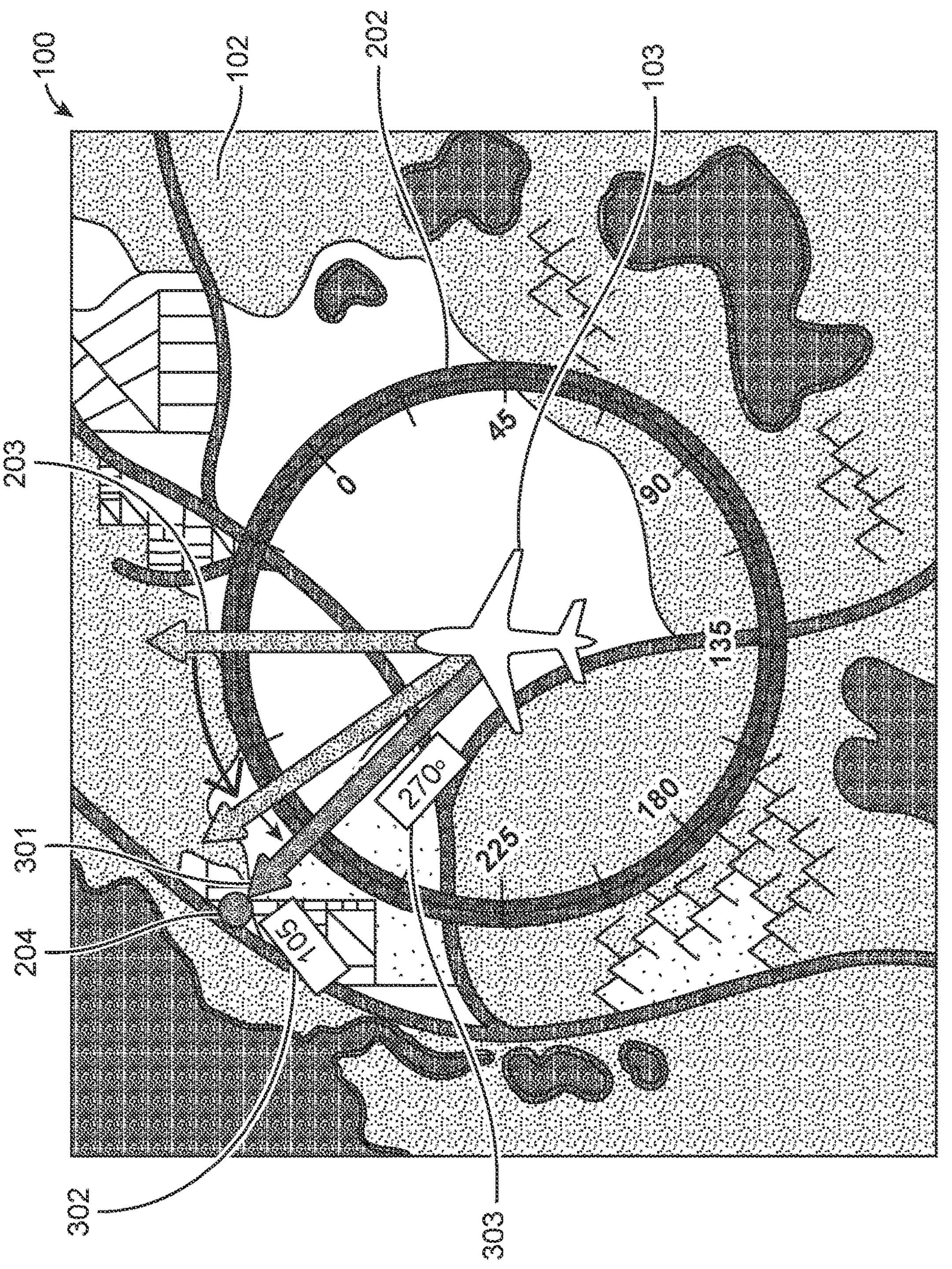
FIG. 9 illustrates the manipulation of one or more flight parameters using incremental snapping to an appropriate round number, according to various embodiments.

FIG. 9 illustrates the manipulation of one or more flight parameters 302, 303 using incremental snapping, according to various embodiments. Flight parameters 302, 303 may be manipulated in predetermined increments. In some embodiments, a controller may select a predetermined increment to be applied to the selection of one or more flight parameters 302, 303. When the ball 204 and second arrow icons 301 are dragged around the compass rose icon 202 and released at a location associated with the one or more flight parameters 302, 303, the ball 204 and second arrow icons 301 may snap to the most appropriate (e.g., the closest value, the next lowest value, the next highest value, etc.) incremental value based on the predetermined increment. Additionally and/or alternatively, the second arrow icon 301 may remain in place on the GUI 100 while the value(s) representing the one or more flight parameters 302, 303 snap to the closest incremental value (e.g., degrees for heading, knots for speed, 100's of feet for altitude, etc.). For example, when a heading 303 of 272 degrees is selected, the displayed heading 303 may snap to the closest multiple of 10, which is 270 degrees. In this case, once released by the controller, the ball 204 and second arrow icons 301 may return to the position of the first arrow icon 203 and gradually transition to the selected heading 303 of 270 degrees. In some embodiments, after selecting one or more flight parameters 302, 303, the ball 204 and second arrow icons 301 and/or the first arrow icon 203 may transition to the selected one or more flight parameters 302, 303 by incrementally snapping to values until the selected one or more flight parameters 302, 303 is reached. For example, if the first arrow icon 203 is at a heading 104 of 280 degrees and a new heading 303 of 270 degrees is selected, the ball 204 and second arrow icons 301 may in a predetermined increment of two, snap from 280 degrees to 278 degrees, to 276 degrees, to 274 degrees, to 272 degrees, before finally snapping to the selected heading 303 of 270 degrees. The controller may manipulate the GUI 100 such that, when selecting the values of one or more parameters, the selected value will snap to predetermined multiples of the values. For example, a controller may set the speed 302 of an aircraft to be displayed in the nearest multiple of 5. When the ball 204 and second arrow icons 301 are dragged to a marker on the compass rose icon 202 indicating a speed of 103 knots, the ball 204 and second arrow icons 301 may snap to a marker indicating a speed of 105 knots. In some embodiments the same predetermined increment may be set for all flight parameters 302, 303. In another embodiment, different predetermined increments may be set for individual flight parameters 302, 303.

The animated GUI 100 described herein is contextual. According to various embodiments, the upper and/or lower limits may be provided by the traffic control data associated with the location, built into the flight map 102, entered by the controller, or auto populated based on live data received from an external source at the server computer executing the GUI 100.

The animated GUI 100 described herein is transparent and/or translucent. According to various embodiments, the animated GUI 100 may render minimal structure (e.g., an annotated compass rose icon 202, rotated to the appropriate magnetic declination), dynamic translucency, no background, and few pixels, hence significant background information on the flight map 102 nor around the aircraft icon 103 is not obscured.

The animated GUI 100 described herein is intuitive. According to various embodiments, the animated GUI 100 accepts input from the controller by manipulating the head of a first arrow icon 203. This first arrow icon 203 indicates current heading 104 and speed 101. Once the head of the first arrow icon 203 is moved, in addition to continuing to show the current heading 104 and speed 101, another second arrow icon 301 (different color) is rendered showing the target heading 303 and speed 302.

Embodiments may also provide one or more non-transitory computer-readable storage medium storing instructions that, upon execution on a computer system (e.g., computing device), cause the computer system (e.g., computing device) to perform the method described above. Embodiments may also provide a system comprising a display screen, one or more processors, and a memory storing instructions that, when executed by the one or more processors, cause the one or more processors to perform the method described above.

Figure 10:
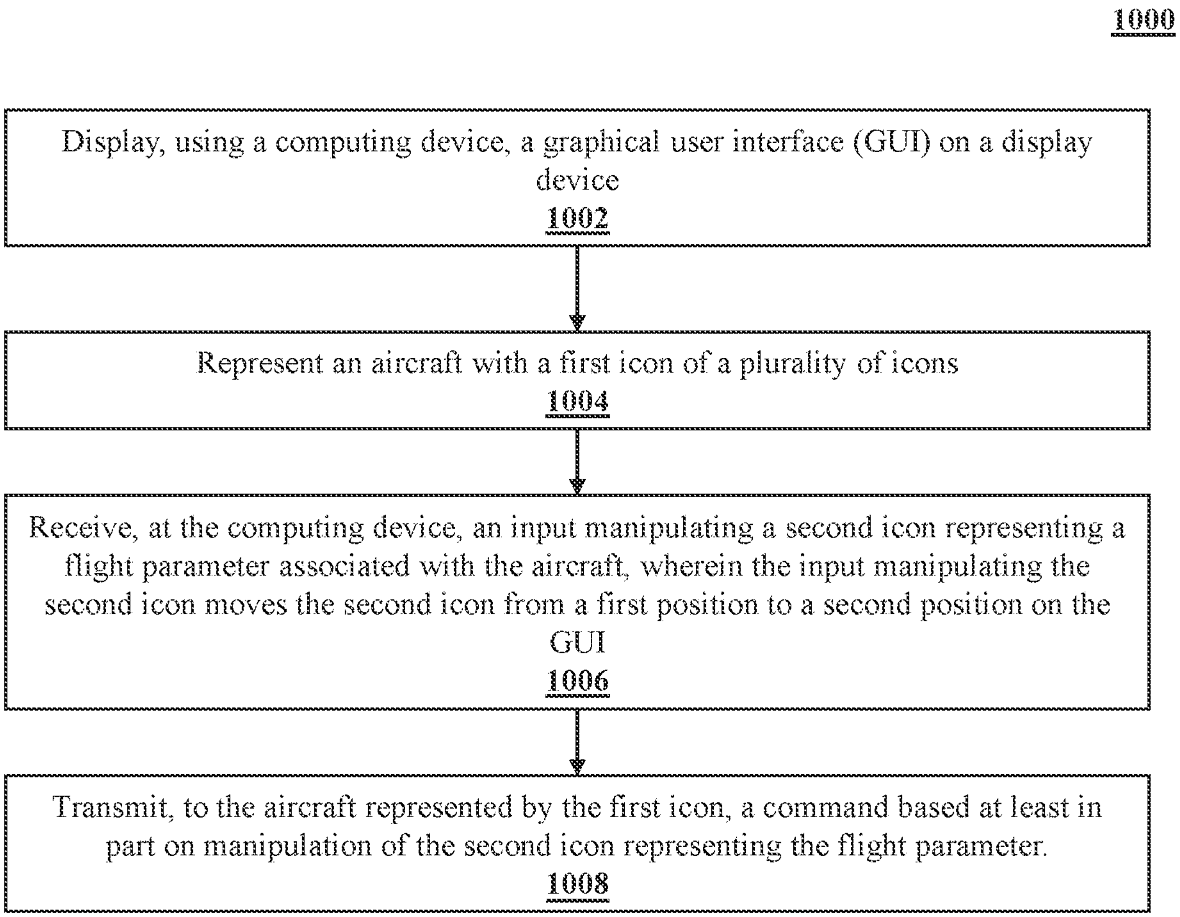
FIG. 10 is a flowchart of an example process performed by a computer system, according to various embodiments.

FIG. 10 is a flowchart of an example process 1000. At step 1002, a GUI 100 is displayed on a display device 1110 using a computing device. An exemplary animated GUI 100 is illustrated in FIG. 1.

At step 1004, an aircraft is represented with a first icon (e.g., aircraft icon 103) of a plurality of icons on the GUI 100. For example, referring back to FIG. 1, the aircraft icon 103 represents an aircraft (e.g., autonomous aircraft) on the GUI 100. In some embodiments, the GUI 100 may display a plurality of icons (e.g., aircraft icon 103), each representing an individual aircraft. Additionally or alternatively, information concerning one or more flight parameters 101, 104 associated with the aircraft represented by the icon (e.g., aircraft icon 103) may be displayed in proximity to the icon (e.g., aircraft icon 103) on the GUI 100. For example, as shown in FIG. 1 a speed flight parameter 101 of 100 knots and a heading flight parameter 104 of 250 degrees are displayed adjacent to the icon (e.g., aircraft icon 103).

At step 1006 the computing device receives an input manipulating a second icon (e.g., a ball icon 204, a first arrow icon 203 and/or a second arrow icon 301) which represents a flight parameter 302, 303 associated with the aircraft. The input manipulating the second icon (e.g., a ball icon 204, a first arrow icon 203 and/or a second arrow icon 301) moves the second icon from a first position to a second position on the GUI 100. For example, referring to FIG. 3, the second arrow icon 301 may be dragged across the GUI 100 to a location representing flight parameters 302, 303. In this example, the second arrow icon 301 is dragged to a location representing a heading flight parameter 303 of 258 degrees and a speed flight parameter 302 of 100 knots. In turn, the computing device may receive a non-alpha numerical input (e.g., a signal transmitted to the server computer from an input device) manipulating the second arrow icon 301, such that the manipulation corresponds to an alpha numerical command (e.g., change heading to 258 degrees and speed to 100 knots). For example, the computing device may translate the manipulation of the second arrow icon 301 to the alpha numerical command that corresponds to the location where the second arrow icon 301 is dragged.

At step 1008 a command based at least in part on the manipulation of the second icon (e.g., a ball icon 204, a first arrow icon 203 and/or a second arrow icon 301) representing the flight parameters 302, 303 is transmitted to the aircraft represented by the first icon (e.g., aircraft icon 103). In some embodiments, information corresponding to the flight parameters 302, 303 associated with the aircraft may be displayed in proximity to the first icon (e.g., aircraft icon 103) representing the aircraft. For example, referring to FIG. 3, after the manipulation of the second arrow icon 301 to a location on the GUI 100 representing a heading flight parameter 303 of 258 degrees and a speed flight parameter 302 of 100 knots, a command based at least in part on said manipulation is transmitted to the aircraft represented by the aircraft icon 103. The GUI 100 may in turn, depict an alpha numerical representation of the flight parameters 302, 303 proximate to the second arrow icon 301 and/or the aircraft icon 103.

Figure 11:
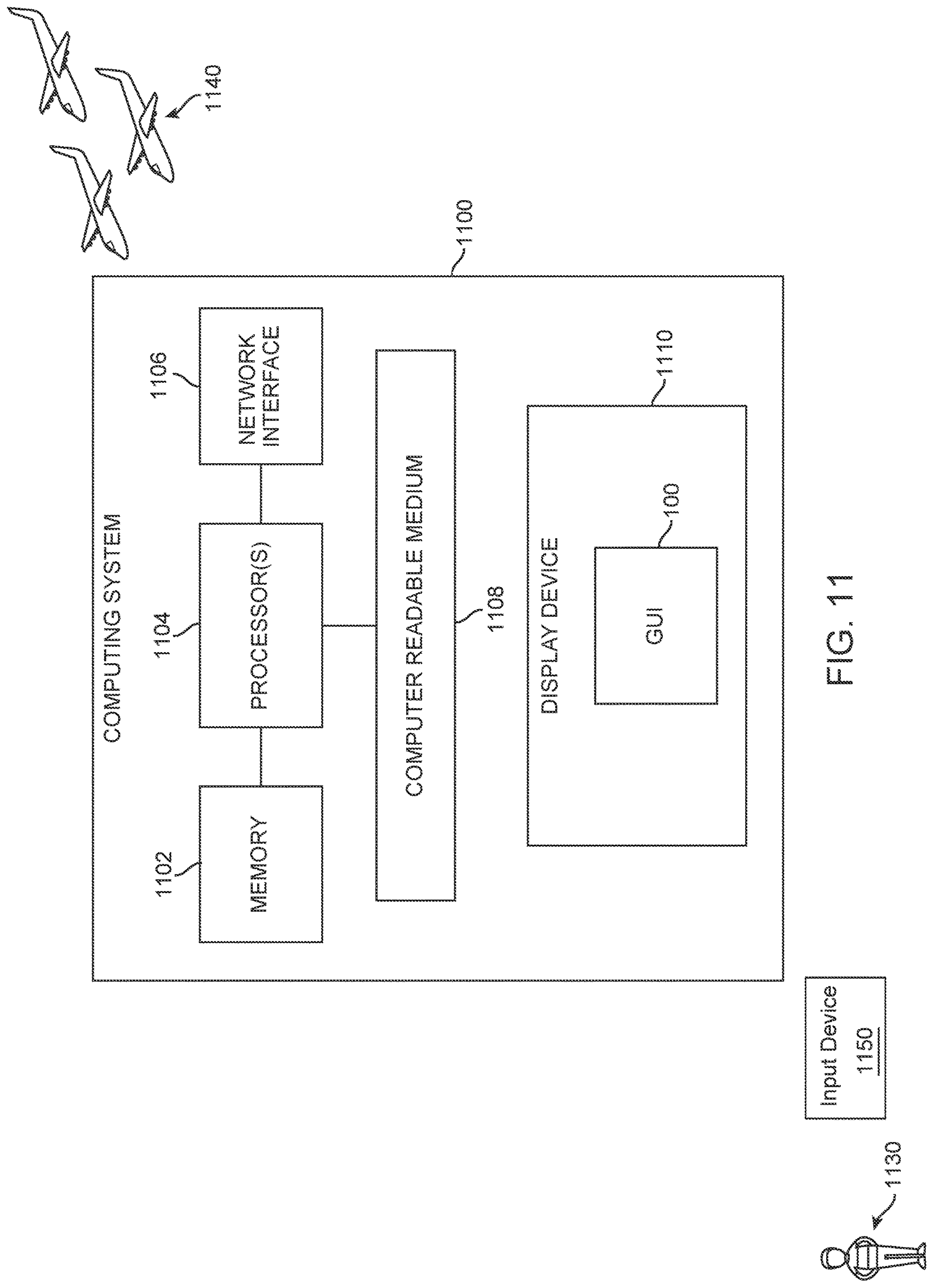
FIG. 11 illustrates an exemplary computing system, according to various embodiments.

FIG. 11 illustrates an exemplary computing system 1100 that may be used to implement various embodiments described herein. The exemplary computing system may be used by a controller 1130 (e.g., a human controller 1130) to monitor and interact with one or more autonomous aircraft 1140 individually and/or collectively. According to various embodiments, the controller 1130 may interact with the computing system 1100 using an input device 1150. For example, the controller 1130 may select an autonomous aircraft 1140 and/or provide commands to the selected autonomous aircraft 1140 by using the input device 1150.

As shown, the computing system 1100 may comprise one or more processors 1104, a system memory 1102 (which may comprise any combination of volatile and/or non-volatile memory such as, for example, buffer memory, RAM, DRAM, ROM, flash, or any other suitable memory device), a network interface 1106 (e.g., an external communication interface), and a computer readable medium 1108 (e.g., non-transitory computer readable medium 1108 storing instructions). Moreover, one or more of the modules may be disposed within one or more of the components of the system memory 1102 or may be disposed externally. The software and hardware modules shown in FIG. 11 are provided for illustration purposes only, and the configurations are not intended to be limiting. The processors 1104, system memory 1102 and/or external communication interface (e.g., network interface 1106) may implement the techniques and/or method(s) described herein.

The network interface 1106 may be configured or programmed to receive and generate electronic messages comprising information transmitted through the computing system 1100 to or from the plurality of autonomous aircraft 1140 (e.g., transmitting and executing instructions). The computing system 1100 may also include at least one display device 1110 for displaying a GUI 100. When an electronic message is received by the computing system 1100 via external communication interface (e.g., network interface 1106) of the computing system 1100, it may be processed, and relevant information may be displayed on the display device 1110 via the GUI 100. When an input is received from the controller 1130 via the GUI 100, it may be processed and relevant information may be transmitted to the corresponding autonomous aircraft 1140. For example, a controller 1130 may use an input device 1150 to input a command to be sent to a plurality of autonomous aircraft 1140. The command may be received by the computing system 1100 where the command is processed and transmitting to the plurality of autonomous aircraft 1140 for execution. According to various embodiments, the computing system 1100 may further be configured to receive supplementary information from third parties, such as air traffic control, weather, other aircraft (e.g., an aircraft that monitors the one or more autonomous aircraft 1140 in the air), etc. The supplementary information may be processed by the computing system 1100 and displayed on the GUI 100 via the display device 1110.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom," "top" or "side" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase “in one example,” “an example,” “in certain examples,” “in certain implementations,” or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A method comprising:

displaying, using a computing device, a graphical user interface (GUI) on a display device;

representing an aircraft with a first icon of a plurality of icons on the GUI;

receiving, at the computing device, an input manipulating a second icon representing a first flight parameter associated with the aircraft, wherein the input manipulating the second icon moves the second icon from a first position representing a first value of the first flight parameter to a second position on the GUI representing a second value for the first flight parameter; and transmitting, to the aircraft represented by the first icon, a command to set the first flight parameter to the second value based at least in part on manipulation of the second icon representing the first flight parameter.

2. The method of claim 1, further comprising:

in response to detecting a selection of the first icon, displaying, associated with the first icon, the second icon and a third icon of the plurality of icons, wherein the third icon is in form of a compass rose centered around the aircraft, the second icon is in form of an arrow, wherein the second icon and the third icon together represent a heading and a speed of the aircraft.

3. The method of claim 2, wherein at least the first, second, and third icons of the plurality of icons are overlaid on a map displayed on the GUI.

4. The method of claim 2, wherein at least the first, second, and third icons of the plurality of icons are transparent.

5. The method of claim 1, further comprising:

displaying a third icon in response to detecting, at the computing device, manipulation of the second icon representing the first flight parameter, the third icon representing an amount of a change in the first flight parameter associated with the aircraft.

6. The method of claim 5, wherein the third icon converges with the second icon at the second position as the aircraft executes the command based at least in part on the manipulation of the second icon.

7. The method of claim 5, wherein the third icon snaps to a location, the location representing a predetermined increment of the first flight parameter.

8. The method of claim 1, further comprising:

displaying a first visual cue indicating transmission of the command to the aircraft; and displaying a second visual cue indicating receipt of the command by the aircraft.

9. The method of claim 1, further comprising:

receiving one or more prohibited flight parameters; and displaying a visual cue indicating the second icon is prohibited from being manipulated to a location in the GUI, the location representing a prohibited flight parameter of the one or more prohibited flight parameters.

10. The method of claim 1, further comprising:

receiving a selection of a location on the GUI for landing the aircraft; and transmitting the command to the aircraft, the command triggering at least one or more flight procedures associated with landing the aircraft on a geographical location corresponding to the location on the GUI.

11. A non-transitory computer-readable storage medium storing instructions that, upon execution on a computer system, cause the computer system to perform steps comprising:

displaying a graphical user interface (GUI) on a display device;

representing an aircraft with a first icon of a plurality of icons on the GUI;

receiving an input manipulating a second icon representing a first flight parameter associated with the aircraft, wherein the input manipulating the second icon moves the second icon from a first position representing a first value of the first flight parameter to a second position on the GUI representing a second value for the first flight parameter; and transmitting, to the aircraft represented by the first icon, a command to set the first flight parameter to the second value based at least in part on manipulation of the second icon representing the first flight parameter.

12. A system comprising:

a display device, one or more processors, a memory storing instructions that, when executed by the one or more processors, cause the one or more processors to perform steps comprising:

displaying a graphical user interface (GUI) on the display device;

representing an aircraft with a first icon of a plurality of icons on the GUI;

receiving an input manipulating a second icon representing a first flight parameter associated with the aircraft, wherein the input manipulating the second icon moves the second icon from a first position representing a first value of the first flight parameter to a second position on the GUI representing a second value for the first flight parameter; and transmitting, to the aircraft represented by the first icon, a command to set the first flight parameter to the second value based at least in part on manipulation of the second icon representing the first flight parameter.

13. The system of claim 12, wherein the instructions, when executed by the one or more processors, cause the one or more processors to perform steps further comprising:

in response to detecting a selection of the first icon, displaying, associated with the first icon, the second icon and a third icon of the plurality of icons, wherein the third icon is in form of a compass rose centered around the aircraft, the second icon is in form of an arrow, wherein the second icon and the third icon together represent a heading and a speed of the aircraft.

14. The system of claim 13, wherein at least the first, second, and third icons of the plurality of icons are overlaid on a map displayed on the GUI.

15. The system of claim 13, wherein at least the first, second, and third icons of the plurality of icons are transparent.

16. The system of claim 12, wherein the instructions, when executed by the one or more processors, cause the one or more processors to perform steps further comprising:

displaying a third icon in response to detecting manipulation of the second icon representing the first flight parameter, the third icon representing an amount of a change in the first flight parameter associated with the aircraft.

17. The system of claim 16, wherein the third icon converges with the second icon as the aircraft executes the command based at least in part on the manipulation of the second icon.

18. The system of claim 12, wherein the instructions, when executed by the one or more processors, cause the one or more processors to perform steps further comprising:

displaying a first visual cue indicating transmission of the command to the aircraft; and displaying a second visual cue indicating receipt of the command by the aircraft.

19. The system of claim 12, wherein the instructions, when executed by the one or more processors, cause the one or more processors to perform steps further comprising:

receiving one or more prohibited flight parameters; and displaying a visual cue indicating the second icon is prohibited from being manipulated to a location in the GUI, the location representing a prohibited flight parameter of the one or more prohibited flight parameters.

20. The system of claim 12, wherein the instructions, when executed by the one or more processors, cause the one or more processors to perform steps further comprising:

receiving a selection of a location on the GUI for landing the aircraft; and transmitting the command to the aircraft, the command triggering at least one or more flight procedures associated with landing the aircraft on a geographical location corresponding to the location on the GUI.

21. The method of claim 1, wherein the second icon represents the first flight parameter and a second flight parameter associated with the aircraft, wherein the first position represents the first value of the first flight parameter and a first value of the second flight parameter, wherein the second position represents the second value for the first flight parameter and a second value for the second flight parameter, and the command transmitted to aircraft sets the first flight parameter to the second value for the first flight parameter, and sets the second flight parameter to the second value for the second flight parameter.

22. The method of claim 21, wherein the first flight parameter is one of a speed, a heading or an altitude of the aircraft, and the second flight parameter is another one of the speed, the heading or the altitude of the aircraft.

* * * * *